Sept. 8, 1925.
R. J. COSSEBOOM
GARDEN CULTIVATOR
Filed Jan. 14, 1924
1,553,218
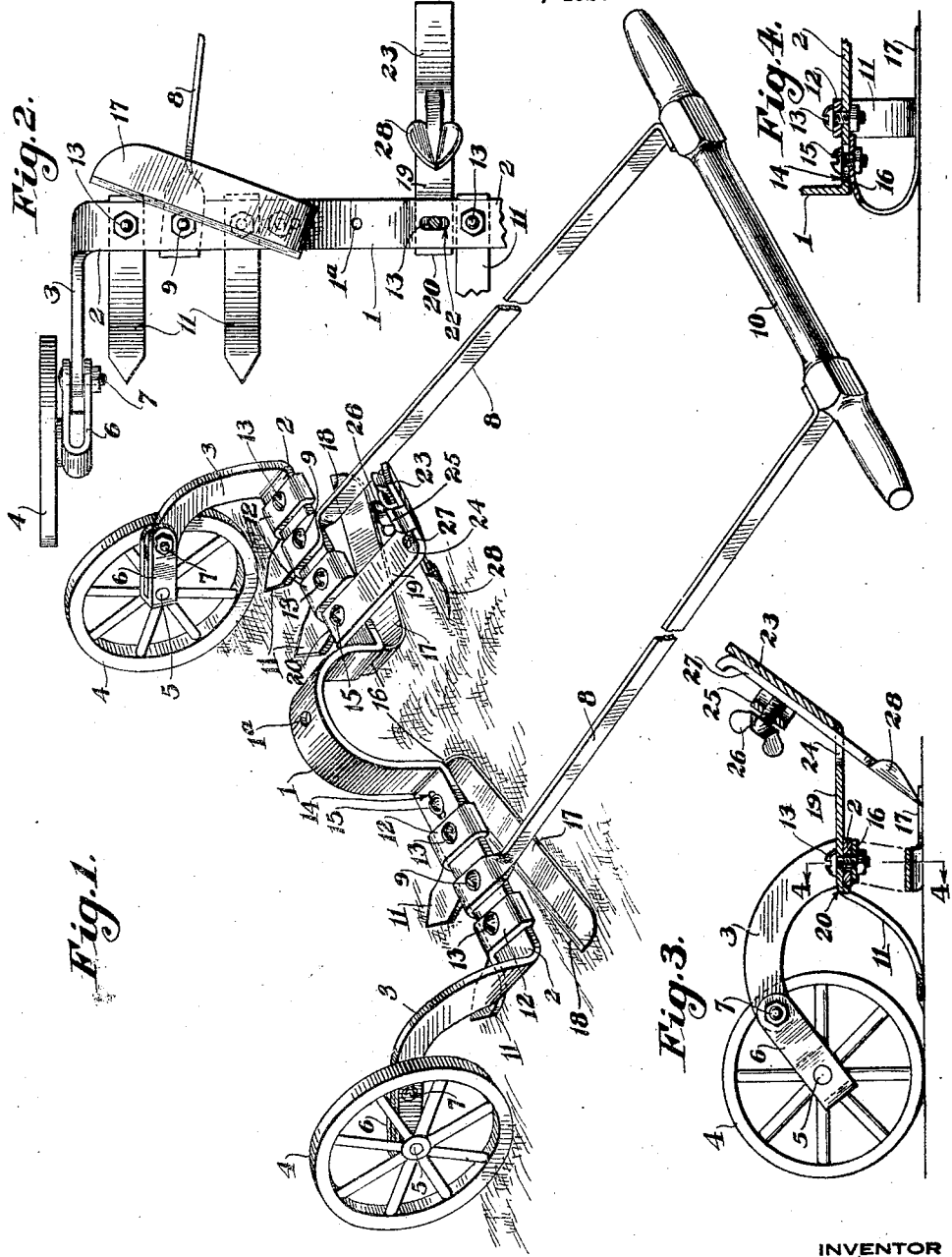
WITNESSES
Louis Goodman
Howard D. Orr
INVENTOR
R. J. Cosseboom
BY
ATTORNEY Patented Sept. 8, 1925.

1,553,218

UNITED STATES PATENT OFFICE.

ROBERT J. COSSEBOOM, OF BUENA VISTA, COLORADO.

GARDEN CULTIVATOR.

Application filed January 14, 1924. Serial No. 686,038.

*To all whom it may concern:*

Be it known that I, ROBERT J. COSSEBOOM, a citizen of the United States, residing at Buena Vista, in the county of Chaffee and State of Colorado, have invented a new and useful Garden Cultivator, of which the following is a specification.

This invention relates to garden cultivators.

The object is to provide an implement for use in the cultivation of gardens which may be easily operated by a person walking in the rear, either with or without the aid of draft animals.

Another object is to provide a strong, light and durable implement having means for cultivating the ground at either side of a row of plants, the device having an arch for straddling the row so as not to injure the growing plants.

In carrying out the invention I provide means for cutting beneath the level of the ground after the same has been loosened and broken up by cultivator teeth, said means consisting of elongated transversely disposed knives which serve to sever the roots of grass and weeds between the rows and to kill the same, both the said knives and the cultivator teeth being vertically adjustable by means of carrying wheels which may be regulated to lift or lower the tools A final object is to provide a ditching device for attachment to the implement to be carried thereby at all times and raised out of the ground when not needed or lowered to provide a ditch between the rows for irrigating purposes when desired.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures;

Figure 1 is a perspective view of the improved hand cultivator.

Figure 2 is a detail inverted plan view of one side of the implement.

Figure 3 is a vertical section through the ditching device.

Figure 4 is a detail section taken on the line 4—4 of Figure 3.

Referring to the drawing there is illustrated a main beam preferably formed of suitable bar iron and bent to form a central arch 1 of suitable height and width to straddle a row of growing plants, and having its end portions then bent to provide horizontal, alined tool-attaching portions 2—2 of sufficient length to attach the necessary tools and to extend somewhat beyond the centers between adjacent rows of plants.

The terminal portions of the said bar are bent to form upwardly and forwardly curved arms 3—3, the forward ends being rounded and provided with bolt openings and being elevated somewhat above the horizontal portions 2—2 of the main beam.

Bearing wheels 4—4 are adjustably mounted on the front ends of the arms 3—3 and are adapted to be raised or lowered to support the beam at the desired elevation above the ground level. The wheels are mounted for rotation upon spindles 5—5, which are suitably secured to and extend outwardly from U-shaped clips 6—6, having the spaced, parallel arms thereof extending rearwardly and straddling the front ends of the arms 3—3, and provided with alined apertures for the reception of bolts 7—7, traversing the bolt hole in the ends of said arms and adapted to be tightened to hold the wheels in adjustment.

At intermediate points along the horizontal portions 2—2 of the beam, rearwardly-extending handle bars 8—8 are attached, as by bolts 9—9, and said bars preferably converge towards each other and are connected at their ends, by a handle bar 10, to be grasped in the hands of the operator who pushes the implement in front of himself when the same is in operation.

Curved cultivator teeth 11 are located in advance of the beam and are formed of suitable spring metal curving upwardly to the upper face of the beam, where they are formed into angular portions or clips 12 which partially surround the beam, and are provided with apertures in alinement with similar apertures in said beam for the reception of bolts 13, which securely fasten the teeth in place and prevent any rotary or lateral movement of the same, it being preferable to secure a cultivator tooth at each side of each handle bar 8 where attached to the main beam, but more or less may be provided.

Adjacent to the portions of the arch 1, where connected to the horizontal portions 2 of the beam, slots 14 are provided in the latter, said slots extending longitudinally of said beam and adapted to receive bolts 15 which securely bind the upwardly-extending, attaching portion 16 of sweeps or blades 17 to the underside of the beam.

The blades 17 extend outwardly at least as far as the horizontal portions of the beam and at an angle to the line of draft, and are provided with front cutting edges 18, which are adapted to pass through the ground, below the surface thereof, after being broken up by the cultivator teeth 11 passing in advance thereof and to sever all roots of grass and weeds. In practice it is advisable to secure the blades 17 to the beam in an angular position, that is with the free outer ends of said blades slightly to the rear of the inner ends of the same, and this may be readily done by loosening the bolts 15 and swinging the blades to the desired position to facilitate their passage through the ground. It will be seen that said blades may be shifted longitudinally by means of the slots 14 toward or from each other in order that their inner cutting portions may not come too near the roots of the growing plants.

At one side of the arch 1, the beam carries a ditching device which may be adjusted into operative position when desired to form a small trench at one side of the growing plants for the purpose of irrigating the same. To this end, a substantially horizontally disposed bar 19 is secured to the upper face of the horizontal portion 2 of the beam at that side of the arch 1. This bar preferably has its front end bent downwardly, as at 20, to bear against the front edge of the beam and to prevent any swinging movement of the bar 19, the latter being held in position by the bolt which serves to secure the adjacent blade 17 in place on the horizontal portion 2 of the beam.

The rear end of the bar 19 is inclined upwardly, as at 23, and at the base of said inclined portion, the bar is provided with a longitudinal slot 24, and substantially midway of the inclined portion 23, the latter is provided with a clip 25 arranged transversely thereof and spaced from the same, the said clip having a central, threaded aperture for the reception of a thumb screw 26.

An elongated shank 27 projects up through the slot 24 and extends beneath the clip 25 thus bearing upon the upper or front face of the inclined arm 23, and is adapted to be rigidly held in such position by the thumb screw 26, the upper end of said shank being forwardly turned to prevent the same from falling from its engagement with the arm, when the screw 26 is loosened. At the lower end, the shank 27 carries a plow shovel 28 of any desired type for digging a small trench when the same is lowered for the purpose.

The arch 1 is provided with an aperture 1$^a$ for the attachment of a small tractor or for a double tree for hitching a team of draft animals when the implement is in use for cultivating gardens on a large scale, where the rows are long or the soil in a condition to render hand operation difficult.

With the implement properly assembled and the wheels 4 adjusted to the desired point of elevation with relation to the main beam, and thus regulate the depth of cultivation, the operator grasps the handle bar 10 and raises the same to the desired height when the cultivator teeth 11 may be caused to penetrate the ground the desired distance to break up the same at each side of the row of plants. As the machine is advanced, the blades 17 engage beneath the surface of the ground, which has already been loosened and broken up by the teeth 11 and cut the roots and grass encountered. By lowering the shank 27, the shovel may form a trench, if desired, and when the trench is not desired, the shovel may be elevated and held out of the ground.

From the foregoing it will be seen that a simple and efficient cultivating implement for garden purposes has been provided, which may be handled by a single person with or without the aid of draft animals to break up the ground adjacent to rows of plants and between the rows thereof, to kill the grass and weeds by destroying the roots thereof without throwing dirt on the small plants; also that an irrigating trench between the rows may be formed at the same time all at one operation, it being necessary to travel a row only once to accomplish the same.

The machine straddles a row of vegetables, the blades reaching nearly to the next row. When you have completed one row and go down the next row, the work is overlapped and one full row is completed with each trip. The shovels being arranged in advance of the blades prevent them from getting dull so quickly. Being arranged at an inclination to the line of draft gives the blades a shear cut.

What is claimed is:

1. A cultivator comprising a transversely disposed main beam having terminal fixed arms extending above the plane of the beam and forwardly thereof, wheels mounted in said arms, cultivator teeth connected to the main beam and extending forwardly, cutting blades carried by and mounted beneath the beam and in spaced relation thereto and at an inclination to the line of draft, and an operating handle connected to the beam at two spaced points thereof for pushing the teeth and the blades through the ground.

2. A cultivator comprising a transverse main beam having a central arch and terminal, forwardly curved fixed arms arranged above the plane of the beam and extending forwardly thereof, vertically adjustable wheels carried by said arms, cultivator teeth connected to the main beam at each side of said arch and extending forwardly, cutting blades carried by and mounted beneath the beam and in spaced relation thereto, a vertically-adjustable ditcher shovel carried by the beam at one side of the center thereof and in rear of the same, and an operating handle connected to the beam and extending to the rear thereof for pushing the teeth and the blades through the ground.

3. A cultivator comprising a transverse beam provided at its center with an upwardly-extending arch, pairs of forwardly-extending, curved cultivator teeth rigidly secured to the beam at each side of the arch, cutting blades arranged beneath and spaced from the beam at each side of the arch, said blades having their inner ends attached to the underside of the beam and arranged at an inclination to the line of draft, wheels carried by the ends of the beam, and an operating handle attached to the latter.

4. A cultivator comprising a main supporting beam having an arch at the center to straddle a row of plants, cultivator teeth on the beam at each side of the arch, said beam having its ends upwardly and forwardly curved to provide terminal rigid arms each having an opening, a U-shaped clip straddling each terminal and having alined openings, wheel spindles carried by the clips, wheels mounted on the spindles, and bolts traversing the alined openings to bind the wheel carrying clip in adjusted angular relation to the said terminal arms.

5. A cultivator comprising a main beam having a central arch and forwardly extending terminal rigid arms, wheels carried at the front ends of said arms, forwardly projecting cultivator teeth mounted on the beam between the arch and terminal arms, rearwardly extending handle bars connected by a handle and secured to the beam between the arch and the arms, and transversely arranged blades arranged in rear of the shovels at an inclination to the line of draft, said blades being secured to the beam.

6. A cultivator comprising a main beam having a central arch and terminal wheel-carrying means at the ends, a pushing handle connected to the beam, a cutting blade arranged beneath the beam at each side of the arch and transversely of the machine, said cutting blades being free at their outer ends and having their inner ends curved up to form attaching portions, and means for adjusting said attaching portions to said beam to permit the blades to be moved towards and from each other and to permit their outer free ends to be swung to the rear.

7. A cultivator comprising a main beam having a central arch and terminal wheel-carrying means at the ends, a pushing handle connected to the beam, a rearwardly extending arm bolted to the beam at one side of the arch and having an upwardly-inclined terminal carrying a transverse clip, said arm having a slot at the base of the terminal, a ditcher-shovel having an elongated shank extending through the said slot and through said clip and resting against the upper face of the inclined terminal, and a set screw traversing the clip and bearing against said shank to adjust the depth of cut of the shovel.

8. A cultivator comprising a main transverse beam, cultivator teeth mounted on said beam and extending forwardly, and a blade attached at one end to the underside of the beam and arranged in a plane below the beam and in rear of said teeth, said blade cutting beneath the surface of the ground after it has been loosened and broken up by the teeth, and said blade being arranged in a substantially horizontal position and inclined to the line of draft.

In testimony that I claim the foregoing as my own, I have hereto affixed my signature.

ROBERT J. COSSEBOOM.